US006650808B1

United States Patent
Vujcic

(10) Patent No.: US 6,650,808 B1
(45) Date of Patent: Nov. 18, 2003

(54) OPTICAL HIGH SPEED BUS FOR A MODULAR COMPUTER NETWORK

(75) Inventor: Dusan D. Vujcic, Centreville, VA (US)

(73) Assignee: Raytheon Company, Lexington, MA (US)

(*) Notice: Subject to any disclaimer, the term of this patent is extended or adjusted under 35 U.S.C. 154(b) by 170 days.

(21) Appl. No.: 09/687,851

(22) Filed: Oct. 13, 2000

Related U.S. Application Data

(60) Provisional application No. 60/159,618, filed on Oct. 14, 1999.

(51) Int. Cl.[7] .................................................. G02B 6/28
(52) U.S. Cl. ..................... 385/24; 385/134; 385/135
(58) Field of Search ..................... 358/24, 134, 135, 358/16, 17, 119, 124; 359/163, 133, 124, 127, 130

(56) References Cited

U.S. PATENT DOCUMENTS

| | | | | |
|---|---|---|---|---|
| 5,181,134 A | * | 1/1993 | Fatehi et al. ............... | 359/117 |
| 5,185,736 A | * | 2/1993 | Tyrrell et al. .............. | 359/136 |
| 5,228,105 A | * | 7/1993 | Glista ....................... | 385/135 |
| 5,446,572 A | * | 8/1995 | Husbands et al. .......... | 359/124 |
| 5,712,942 A | * | 1/1998 | Jennings et al. ............ | 385/134 |
| 5,726,788 A | * | 3/1998 | Fee et al. ................... | 359/118 |
| 6,315,463 B1 | * | 11/2001 | Kropp ......................... | 385/88 |
| 6,333,940 B1 | * | 12/2001 | Baydar et al. .............. | 370/466 |
| 6,335,992 B1 | * | 1/2002 | Bala et al. .................. | 359/115 |

* cited by examiner

Primary Examiner—Frank G. Font
Assistant Examiner—Kaveh Kianni
(74) Attorney, Agent, or Firm—Baker Botts L.L.P.

(57) ABSTRACT

A modular optical data communication network operational as a computer backplane includes interconnectable bus modules providing both optical data transmission and electrical data transmission. Each bus module comprises and optical link interface having one input receiving data from an optical/electrical converter and a second terminal connected to receive electrical data from an electrical/optical converter. The bus modules are interconnectable by coupling an electrical/optical converter of one module to an optical/electrical converter of an adjacent module through a free-space connection. Each optical link interface includes a row by column VCSEL/photodetector array for dedicated path transmission of data over an optical network from a circuit card coupled to one bus module transmitting data to a circuit card of an adjacent or remote bus module.

12 Claims, 7 Drawing Sheets

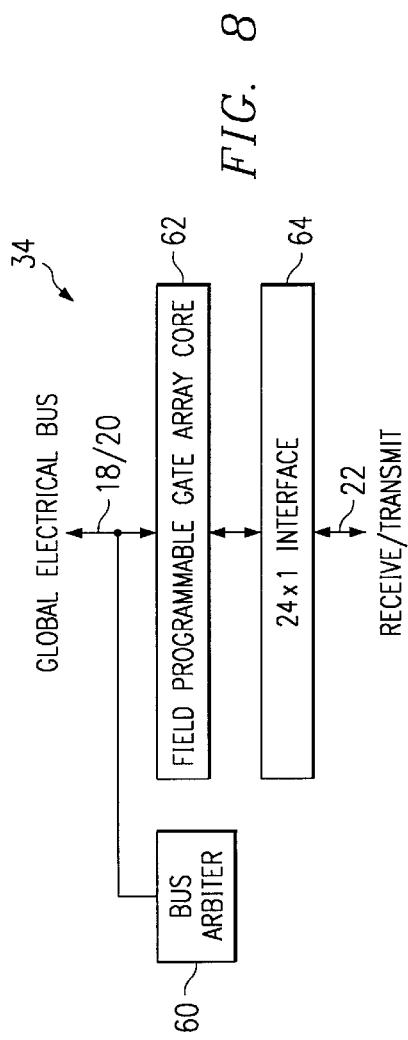
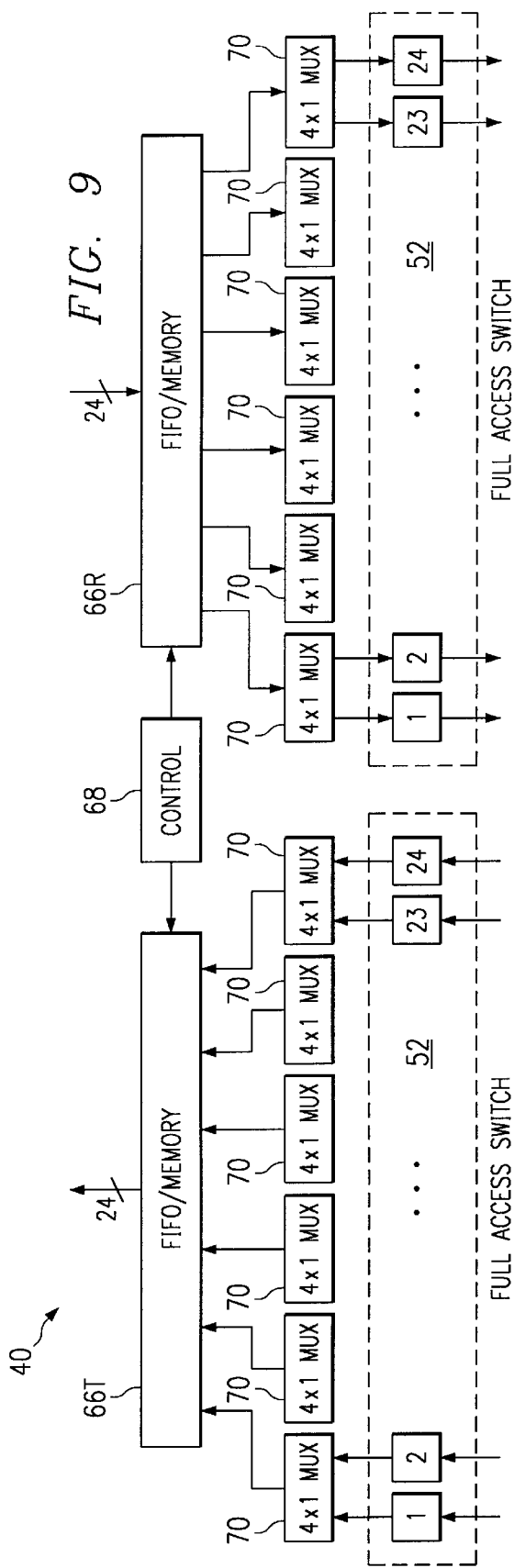

OPTICAL HIGH SPEED BUS FOR A MODULAR COMPUTER NETWORK

RELATED APPLICATION

This application claims the benefit of U.S. provisional application Serial No. 60/159,618 filed Oct. 14, 1999, entitled Optical High Speed Bus and High Speed Modular Computer Backplane.

TECHNICAL FIELD OF THE INVENTION

This invention is related in general to light beam routing in a computer system, and more particularly, the invention is related to a high speed bus and high speed modular light beam routing for a computer.

BACKGROUND OF THE INVENTION

Most people familiar with computer-based systems know that the primary mechanism to transfer data from one circuit card to another and for interconnecting the circuit cards is the backplane. Also known as a motherboard, the backplane is typically a printed circuit board with a limited number of sockets into which circuit boards may be inserted. Typically, an interrupt-based bus protocol is used to arbitrate between contending circuit cards requiring access to the bus.

Such backplane-based system bus architectures suffer from several disadvantages. The bandwidth or speed of the system is limited. For example, conventional small PCI (peripheral component interconnect) bus systems run at a maximum aggregate bandwidth of 133 megabytes per second. The number of circuit cards that may be part of the system is also restricted to the number of available sockets on the backplane. The backplane itself also adds weight and size to the system. Many backplanes are also custom designed, thereby adding cost and time to the development cycle.

In order to fully interconnect all circuit cards in the system, a large full access switch is required. Current networking topologies that guarantee data delivery in real time, such as asynchronous transfer mode (ATM) switches, require large switching hubs. Further, in order to achieve large bandwidths, conventional systems use single coax or fiber optic cables to carry the data traffic. Each link also requires a dedicated network adaptor card.

A unique system application is for those systems that require a separation of secured or encrypted and unsecured or decrypted data. Conventional systems use complex networks of discrete filters to isolate the secured or encrypted data from the unsecured data. These discrete filters take up extra space and require elaborate tests to verify the isolation of the secured data. Further, the speed of the backplane is adversely impacted.

SUMMARY OF THE INVENTION

In accordance with the present invention there is provided a bus module providing mechanical, electrical, optical, and power interface for individual circuit cards and for network adaptability. Each bus module provides low latency interconnectivity between modules for data packet transfer, such as 32-bit word read and write. Interconnectability of the bus module provides near unrestricted expansion of a computer backplane.

Each bus module includes an optical interface—left and optical interface—right. Each interface comprises a two-dimensional N by N, for example 16×16, bi-directional array of VCSEL (vertical cavity surface emitting laser)/photodetector elements. Each bi-directional VCSEL/photodetector element functions to provide high speed data communication through interconnected adjacent bus modules from one module in the interconnection to any other module by means of a pre-programmed transfer path through VCSEL/photodetector elements arranged in a row by column matrix. This provides the advantage of a high-speed data transfer without the need for a header for each data packet. The interconnection of one circuit card to other circuit cards through the interconnected bus modules is along a fixed path known to both the transmitting circuit card and the receiving circuit card.

In accordance with the present invention VCSEL/photodetector element arrays pass data to each other over free space. Bus alignment is an important aspect of this interconnect technology that allows programmed interconnect schemes by establishing dedicated channels from bus module "m" to bus module "n", where "m" and "n" are within the range of 2 to N. By establishing such dedicated data links switching data transfer is simplified. The number of modules "C" that can be interconnected is valid for all positive values of "C" and "m" satisfying the equation $C(C-1) < 2m$.

In accordance with the present invention, there is provided an optical data transfer network comprising at least one network backplane bus module having a global electrical bus, a local electrical bus, and an optical bus. A plurality of bi-directional optical/electrical converters coupled to the optical bus converts optical signals to electrical signals and vice versa. An optical link interface coupled between the local electrical bus and the bi-directional optical electrical converters routes data between the local electrical bus and the optical bus. A controller coupled to an optical link interface provides signals for controlling data routing between the local electrical bus, the global electrical bus and the optical bus.

BRIEF DESCRIPTION OF THE DRAWINGS

For a better understanding of the present invention, reference may be made to the accompanying drawings, where:

FIG. 8 is a block diagram of an embodiment of a bus interface according to the teachings of the present invention;

FIG. 9 is a block diagram of an embodiment of a receive/transmit circuit according to the teachings of the present invention;

DETAILED DESCRIPTION OF THE INVENTION

Figure 1:
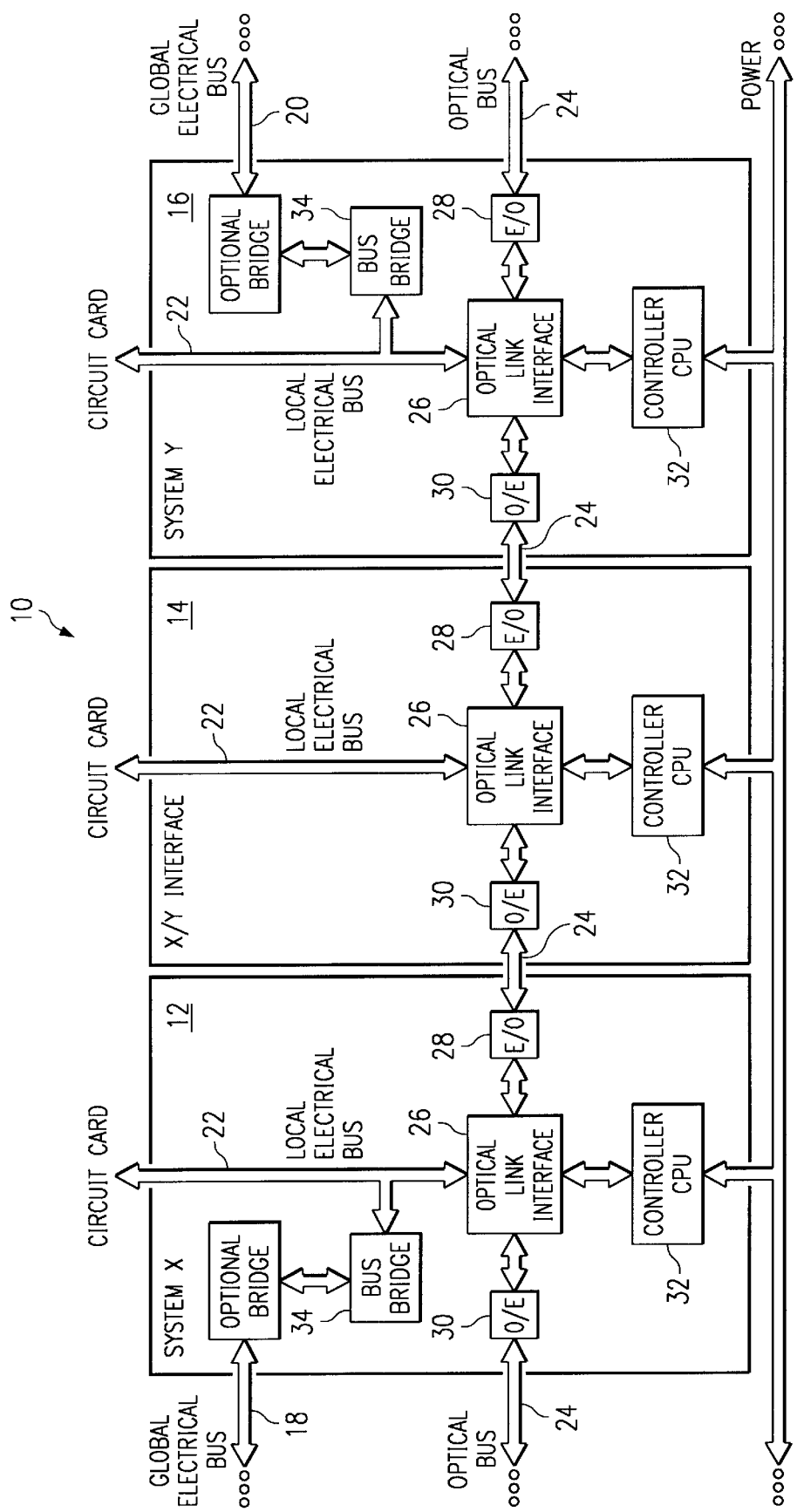
FIG. 1 is a block diagram of an embodiment of an interface module coupled between a secured bus module and an unsecured bus module according to the teachings of the present invention.

FIG. 1 is a block diagram of an embodiment of a high speed modular backplane system 10 having at least one secured bus module 12 (system X) coupled to an interface module 14 (X/Y Interface), in turn coupled to at least one unsecured bus module 16 (system Y). Each module 12, 14 and 16 is constructed according to the teachings of the present invention. The secured bus module 12 and the unsecured bus module 16 have separate and independent global electrical buses 18 and 20, respectively, to isolate the sensitive confidential (secured) data from unsecured data. The interface bus module 14 does not have a global electrical bus. Each bus module 12, 14 and 16 has a local electrical bus 22 coupled to a circuit card (not shown) plugged into the bus modules by means of a conventional circuit card connector. An optical bus 24 links the bus modules together. Secure data is transmitted and received on the optical bus 24 utilizing a different optical wavelength from the optical wavelength utilized for unsecured data to maintain data isolation. An optical link interface 26, an electrical/optical converter 28 and optical/electrical converter 30, in each module 12, 14 and 16 serve as the interface between the local electrical bus 22 and the optical bus 24 in each bus module under the control of a controller central processing unit (CPU) 32. A bus bridge 34 in the modules 12 and 16 is an optional bus data buffer. A bus module with a bus bridge 34 is used when there is more than a predetermined number of bus modules interconnected.

Figure 2:
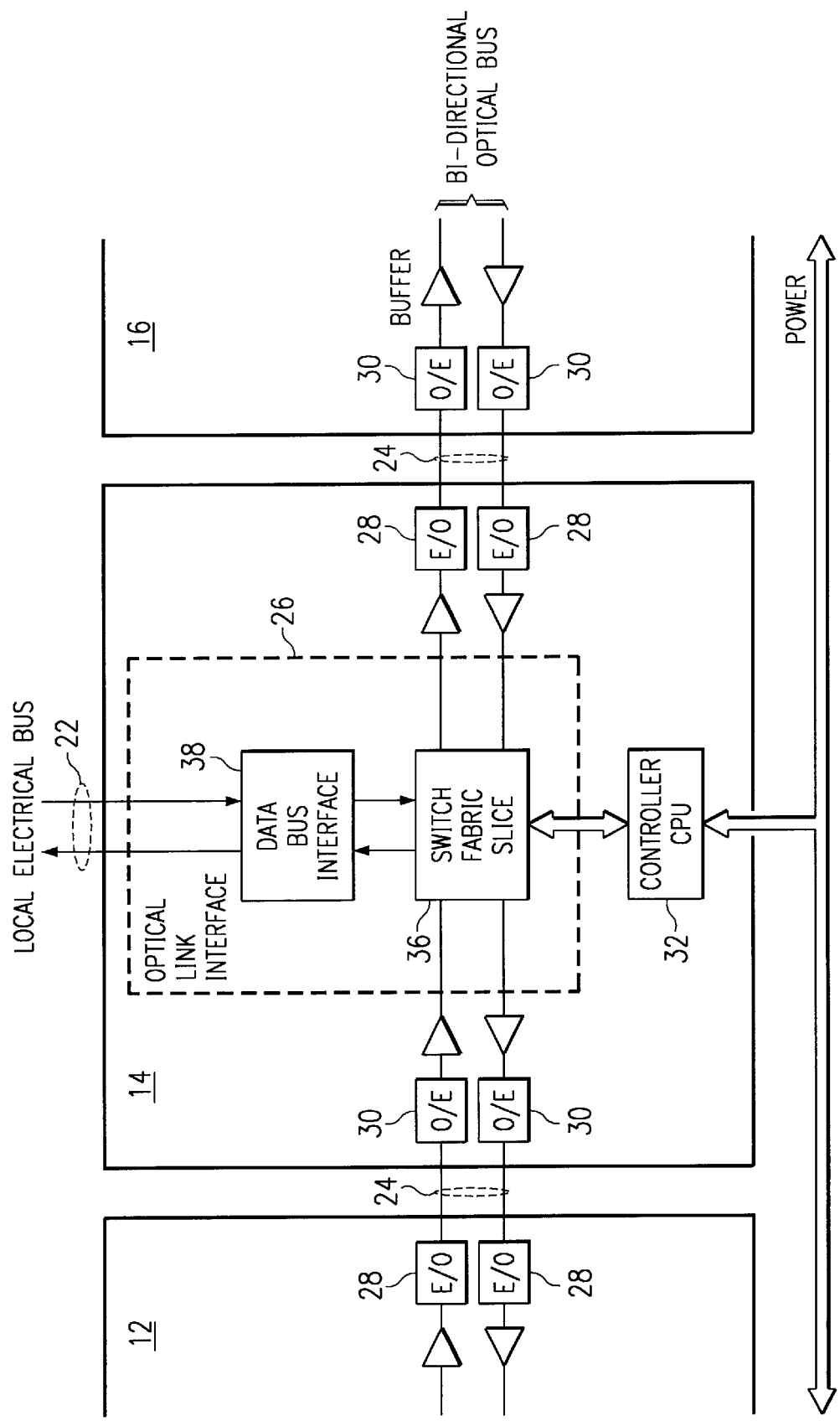
FIG. 2 is a block diagram of an embodiment of a portion of the bus module according to the teachings of the present invention.

FIG. 2 is a block diagram of an embodiment of an optical link interface 26 in a bus module according to the teachings of the present invention. The optical link interface 26 includes a switch fabric slice 36 that performs signal routing between the optical bus 24 and the local electrical bus 22. A data bus interface 38 is coupled to the switch fabric slice 36 as an interface between the optical bus 24 and the local electrical bus 22.

Figure 3:
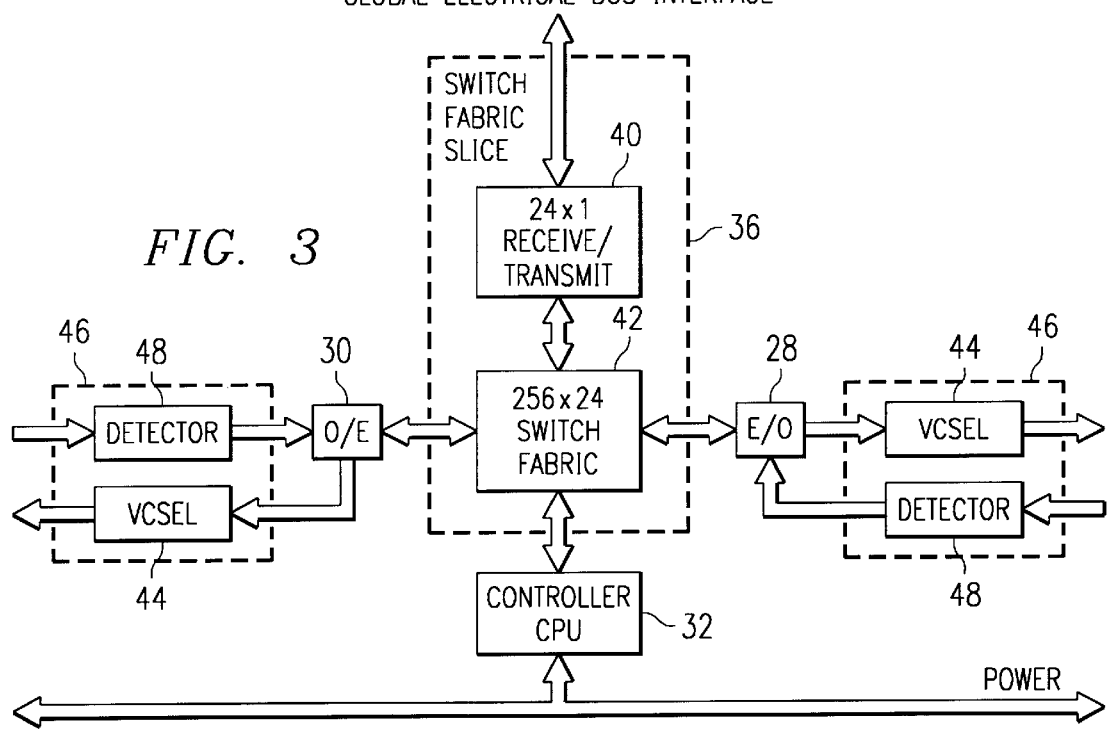
FIG. 3 is a more detailed block diagram of an embodiment a portion of the bus module according to the teachings of the present invention.

Referring to FIG. 3 there is shown a more detailed block diagram of the switch fabric slice 36 and optical bus buffers of a bus module according to the teachings of the present invention. The switch fabric slice 36 includes a receive/transmit circuit 40 coupled to a switch fabric 42. The electrical/optical converter 28 and optical/electrical converter 30 each connects to buffer 46 having a predetermined wavelength VCSEL/photodetector diode 44 outputting a light signal and a predetermined wavelength photodetector 48 receiving light for conversion to an electrical signal. To insure optical isolation for security, the module 14 of FIG. 1 includes two different predetermined wavelength VCSEL/photodetector diodes 44 for secure and unsecure outputting of light signals and two different predetermined wavelength photodetectors 48 receiving light for conversion to an electrical signal.

Figures 4, 5:
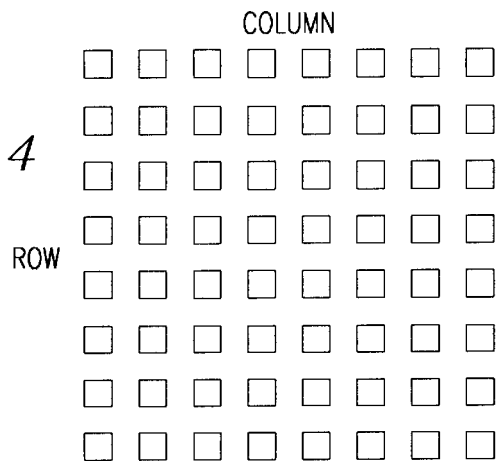
FIG. 4 is a block diagram showing a representative layout of VCSEL/photodetector pairs according to the teachings of the present invention.
FIG. 5 is a diagram illustrating an exemplary network channel interconnection scheme using the VCSEL/photodetector matrix.

FIG. 4 is a matrix illustration showing a representative layout of VCSEL/photodetector according to the teachings of the present invention. The exemplary layout is in a row and column configuration where each rectangle represents a VCSEL/photodetector and detector pair. Although the illustration shows an eight-by-eight array, the typical application utilizes an M by M array of laser/detector pairs, where "M" is a positive number.

FIG. 5 is a diagram illustrating an exemplary network channel interconnection for four circuit cards using the VCSEL/photodetector matrix as illustrated in FIG. 4. In this example, the VCSEL/photodetector diode and photodetector pair in column 1, row 4 of card 1 is used to transmit data from circuit card 1 to circuit card 4. Therefore, the switch matrices for circuit cards 1 through 4 are configured to receive data from the local electrical bus in circuit card 1, transmit the data onto the optical bus in bus module 1, repeat the received data to pass through bus modules 2 and 3, and route the received data to the local electrical bus in circuit card 4 and then to circuit card 4 plugged into bus module 4.

Figure 6:
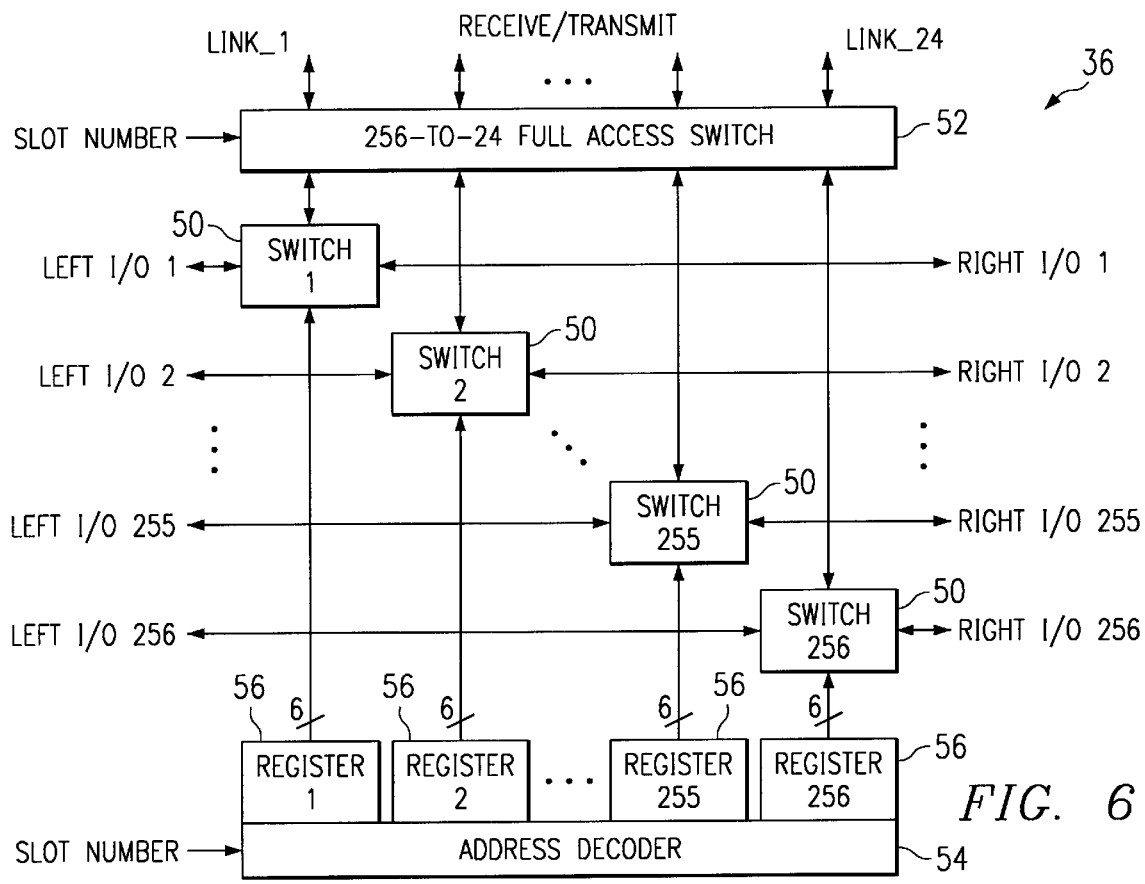
FIG. 6 is a block diagram of an embodiment of switch fabric according to the teachings of the present invention.

FIG. 6 is a block diagram of an embodiment of switch fabric 36 according to the teachings of the present invention. By way of example, the switch fabric 36 comprises 256 (m) electrical signal switches 50 each having a left input output connection to one of the optical/electrical converters 30. The general relationship between "C" and "m" is given by the expression $C(C-1)<2m$, as stated earlier. Each of the electrical signal switches 50 also includes a right input output connection to one of the electrical/optical converters 28 as illustrated in FIGS. 2 and 3. Each of the switches 50 is programmable to pass an electrical signal received at a left connection through the switch and applied to a right connection or in the alternative, depending on the program, the receive signal is directed to a multiplexer 52. The multiplexer 52 is configured to receive a signal from any one of the 256 switches 50 for multiplexing to 1 of 24 possible serial links connected to a circuit card coupled to one of the bus modules containing a fabric switch 36.

As illustrated in FIG. 6, the switch fabric 36 is configured to receive an electrical input signal on any one of 256 input lines and to transmit the received electrical signal to one of 256 output lines, where both the input lines and output lines are individually connected to one of the 256 switches 50. Each of the 256 switches 50 are coupled to an address decoder 54 through one of 256 address registers 56. The address decoder 54 receives a slot number code from the controller CPU 32 to either pass the input signals to an output terminal or to pass an input signal to the multiplexer 52. This pass-through function is illustrated in FIG. 5 and previously discussed.

Although the description of FIG. 6 to this point only discussed transmission of signals from the multiplexer 52, the multiplexer is bi-directional and also receives signals from a circuit card, thus making the switch fabric slice 36 also bi-directional. A signal received at one of the 24 inputs to the multiplexer 52 is applied to each of the 256 switches 50 that are individually programmed to transmit a received signal either to the left or to the right, that is, to an adjacent switch fabric slice 36 or to terminate the received signal within the switch 50. This operation enables transmission of a received signal to an adjacent circuit card coupled to an adjacent bus module in a manner as described with reference to FIG. 5, cards 2 and 3.

Figure 7:
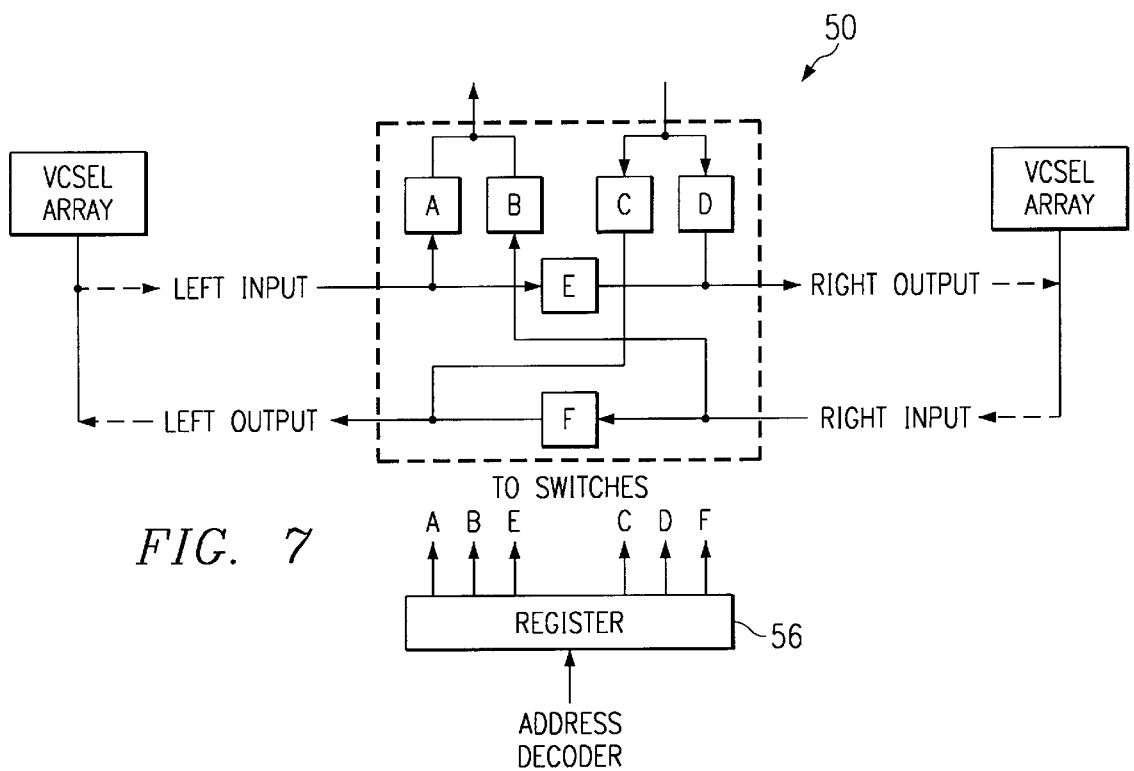
FIG. 7 is a block diagram of an embodiment of a full access switch of the switch fabric according to the teachings of the present invention.

FIG. 7 is a block diagram of an embodiment of an access switch 50 of the switch fabric 36 according to the teachings of the present invention. The blocks labeled A through F are two-position switches which are opened or closed under the control of a signal from switch register 56 on one of the lines A–F. Data to be passed through the switch fabric slice 36 on an optical bus is transmitted via closed switches E and F. Data to be sent to or received from the local electrical bus 22 are transmitted via switches A through D.

Referring to FIG. 8, there is shown a block diagram of an embodiment of a global electrical bus interface 34 according to the teachings of the present invention. The bus interface 34 includes a bus arbiter 60, a field programmable gate array core 62, and an interface circuit 64. The bus arbiter 60 responds to data on the global electrical bus 18 or 20 (FIG. 1) to control the transfer of electrical data signals to adjacent bus modules. Electrical data signals on the global electrical bus 18 or 20 are also input to the field programmable gate array core 62 that functions to selectively format electrical data signals for transmission from a bus module. The bus arbiter 60 in combination with the gate array core 62 identifies when electrical data transmitted on the global electrical bus 18 or 20 is intended for the circuit card coupled to the bus module.

An output from the gate array core 62 is applied to the 24 by 1 interface 64 in accordance with the identified circuit card coupled to a particular bus module. Typically, the interface 64 is a multiplexer. Data output from the interface 64 is applied to the local electrical bus 22, and if identified with the circuit card coupled to a particular bus module, then the data is transferred to the circuit card. If the electrical data on the local electrical bus 22 is to be transmitted on the optical bus 24 then the output of the interface 64 is routed through the optical link interface 26.

The above description of the bus interface 34 is based on the assumption that data is received by the bus interface on the global electrical bus 18 or 20. The bus interface 34 is bi-directional and is configured to also receive electrical data from a circuit card or electrical data from the optical link interface 26, in either case for further transmission on the global electrical bus.

FIG. 9 is a block diagram of an embodiment of a receive/transmit circuit 40 according to the teachings of the present invention. The receive/transmit circuit 40 includes memory circuits 66T or 66R such as a FIFO (first-in-first-out) registers, a controller 68, and an array of multiplexers 70 (MUXs). Each of the multiplexers 70 is connected to the full access switch 52 (see FIG. 6) and multiplexes the received inputs to the respective memory 66T or 66R. Each of the memories 66 in response to control signals from the controller 68 selects the input from the multiplexers coupled thereto for transmission to a circuit card connected to the bus module. The selected electrical data signal may also be coupled through the global electrical bus interface 34 to the global electrical bus 18 or 20. The electrical bus 20 is also configured to receive electrical data from a circuit card or the global electrical bus 18 or 20 through the memory 66R.

When receiving data, the receive/transmit circuit 40 distributes a signal from a memory 66R to the multiplexers connected thereto for further transmission and processing by full access switch 52. The memory 66T receives electrical data from the full access switch 52 for transmission to a circuit card or for transmission over the global electrical bus 18 or 20 while the memory 66R functions to receive electrical data from a circuit card by means of the global electrical bus 18 or 20. Operation of the memory 66T and the memory 66R is in accordance with signals from the controller 68.

Figure 10:
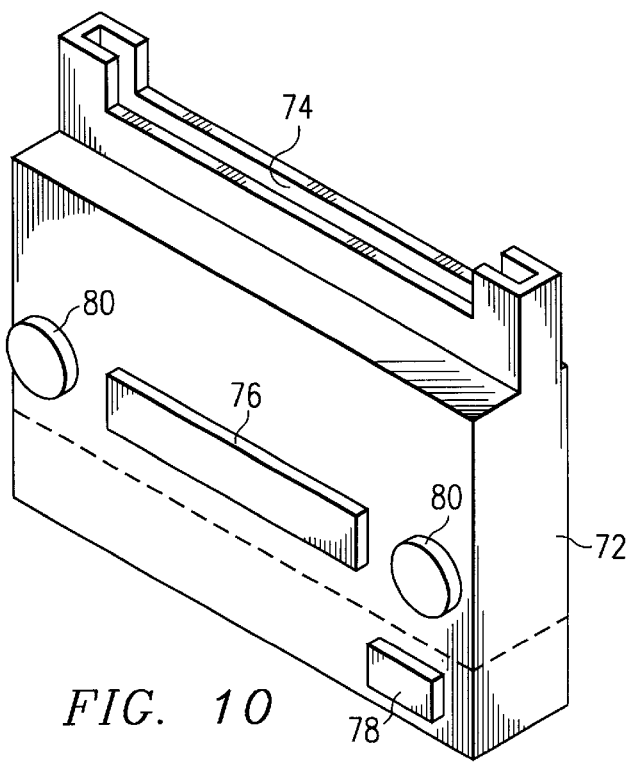
FIG. 10 is a perspective view of an embodiment of a high speed electrical and optical bus module according to the teachings of the present invention.

FIG. 10 is a perspective view of an embodiment of a high speed electrical and optical bus module 72 according to the teachings of the present invention. The bus module 72 configured to enable interconnection of a plurality of bus modules to form a computer backplane. The bus module 72 includes slot 74 containing an electrical connector to provide coupling to a circuit card (not shown). Optical ports or windows 76 are provided to receive and transmit optical signals when assembled together with adjacent bus modules. Electrical connectors 78 are provided to interconnect the bus modules 72 to form a global electrical bus 20. The bus modules also include alignment buttons 80 or other mechanical connectors to provide secure physical connections with an adjacent bus module. Thus each module is also provided with mating elements to receive the alignment buttons.

Figure 11:
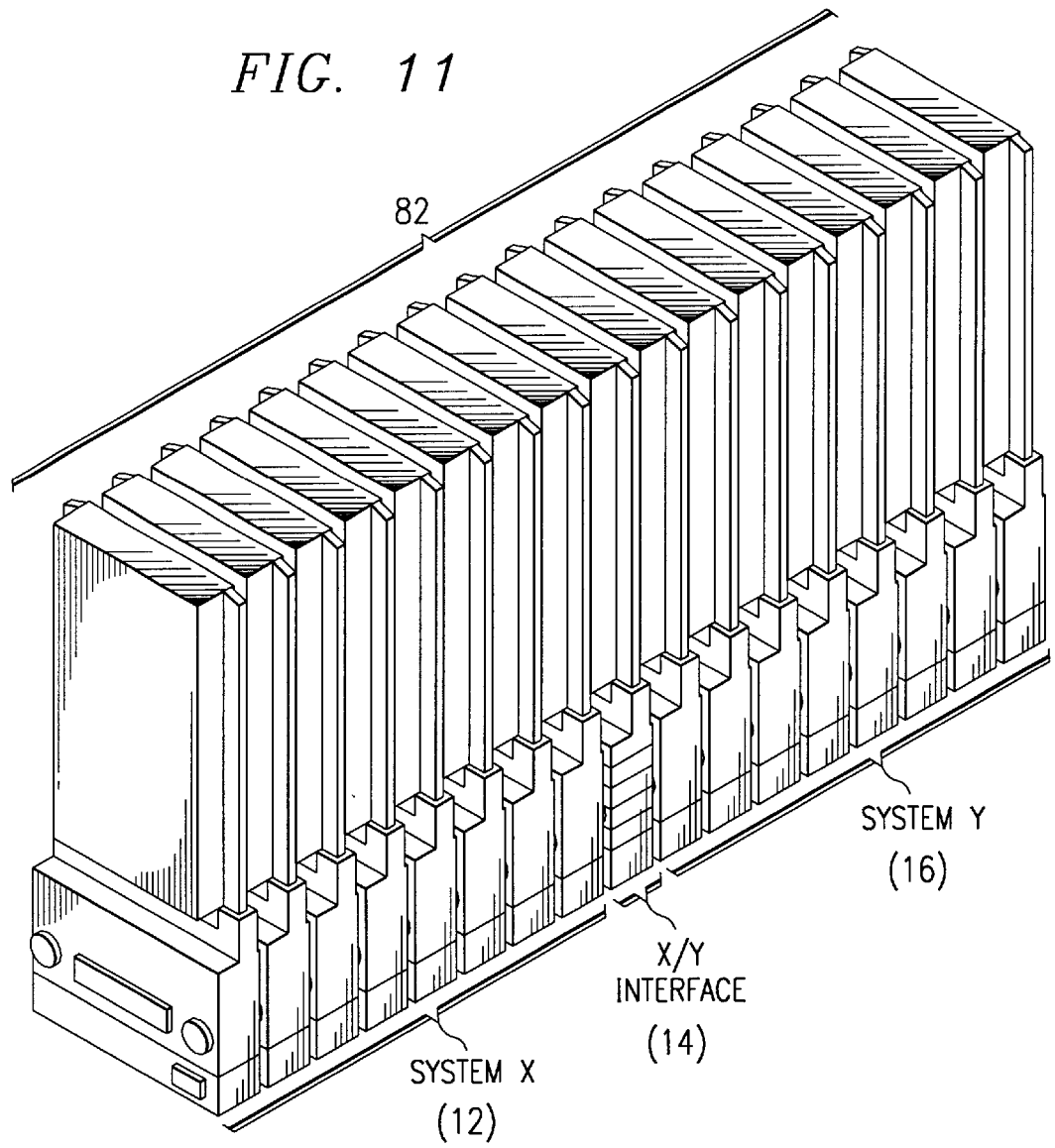
FIG. 11 is a perspective view of an embodiment of a series of interconnected high speed electrical and optical bus modules according to the teachings of the present invention.

Referring to FIG. 11 there is shown a perspective view of a plurality of interconnected high speed electrical and optical bus modules 12, 14, 16 according to the teachings of the present invention. Also shown are circuit cards 82 plugged into the card slots 74 of the bus modules. The interface bus module 14 is shown disposed between secured bus modules 12 and unsecured bus modules 16 to maintain separation and confidentiality of secured data.

The invention is a modular computer backplane and a full access switched network. In particular, secured data is separated and isolated from unsecured data to ensure confidentiality. The invention is fully scalable due to its modularity.

Although several embodiments of the present invention and its advantages have been described in detail, it should be understood that changes, substitutions, modifications, variations, and alterations can be made without departing from the teachings of the present invention as set forth by the appended claims.

What is claimed is:

1. A data transmission network comprising:
   a local electrical bus;
   an input optical bus;
   an output optical bus;
   a network backplane module, comprising:
      a plurality of bidirectional optical-electrical converters coupled to the input optical bus for converting an optical signal transmitted on the input optical bus into an electrical signal and vice versa;
      a plurality of bidirectional electrical-optical converters coupled to the output optical bus for converting an optical signal transmitted on the output optical bus into an electrical signal and vice versa;
      an optical link interface coupled to the local electrical bus and the plurality of bidirectional optical-electrical converters coupled to the input optical bus and the plurality of bidirectional electrical-optical converters coupled to the output optical bus for selecting data and routing the selected data between the local electrical bus and the input optical bus or the output optical bus or between the input optical bus and the output optical bus; and
      a controller coupled to the optical link interface for locally controlling the selected data routing between the local electrical bus, the input optical bus and the output optical bus.

2. The data transmission network, as set forth in claim 1, wherein each network backplane module further comprises an optional driver coupled to the global electrical bus for buffering the electrical signal transmitted thereon.

3. The data transmission network, as set forth in claim 1, wherein each of the optical-electrical converters and each of the electrical-optical converters further comprises:
   a photodetector receiving a plurality of optical signals from the input or output optical bus for a predetermined number of incoming/outgoing channels for converting the received optical signals to a plurality of electrical signals coupled to the optical link interface; and
   a laser diode receiving a plurality of electrical signals from the optical link interface for generating and transmitting a plurality of optical signals in response to the electrical signals.

4. The data transmission network, as set forth in claim 3, comprising:
   a first plurality of network backplane modules wherein the laser diodes emit optical signals at a first predetermined wavelength and the photodetectors receive optical signals at the first predetermined wavelength;

a second plurality of network backplane modules wherein the laser diodes emit optical signals at a second predetermined wavelength and the photodetectors receive optical signals at the second predetermined wavelength; and at least one of the plurality of network backplane modules coupled between the first and second plurality of network backplane modules, wherein the laser diodes and photodetectors coupled to the first plurality of network backplane modules emit and receive optical signals at the first predetermined wavelength and the laser diodes and photodetectors coupled to the second plurality of network backplane modules emit and receive optical signals at the second predetermined wavelength.

5. The data transmission network, as set forth in claim 3, wherein the laser diode comprises a vertical cavity surface emitting laser (VCSEL) diode.

6. The data transmission network, as set forth in claim 5, further comprising:

a first network backplane module wherein the VCSEL diode emit optical signals at a first predetermined wavelength and the photo detectors receive optical signals at the first predetermined wavelength;

a second network backplane module wherein the VCSEL diode emit optical signals at a second predetermined wavelength and the photo detectors receive optical signals at the second predetermined wavelength; and a third network backplane module coupled between the first and second network backplane modules, wherein the VCSEL diode and photodetectors coupled to the first network backplane module emit and receive optical signals at the first predetermined wavelength and the VCSEL diodes and photodetectors coupled to the second network backplane module emits and receives optical signals at the second predetermined wavelength.

7. The data transmission network, as set forth in claim 1, wherein the optical link interface comprises:

a switch fabric controlling the electrical signal to and from the local electrical bus or to the input or output optical bus;

at least one parallel-to-serial converter coupled to the switch fabric;

a first-in first-out (FIFO) memory coupled to the at least one parallel-to-serial converter for storing a plurality of electrical signals;

a bus standard core coupled to the local electrical bus; and a bus arbiter arbitrating control between the optical link interface and a circuit card.

8. The data transmission network, as set forth in claim 7, wherein the switch fabric comprises a plurality of switches routing data to and from the local electrical bus or the input or output optical bus under the control of the controller.

9. A computer system backplane, comprising:

a plurality of interconnected network backplane modules including a first module coupled to an interface module, the interface module coupled to a second module, the interconnected modules forming an electrical bus and an optical bus;

the modules each comprise:

a local electrical bus coupled to a circuit card;

a plurality of bidirectional optical-electrical converters coupled to the optical bus for converting an optical signal transmitted on the optical bus into an electrical signal and vice versa;

an optical link interface coupled between the local electrical bus and the bidirectional optical-electrical converters to select data and route selected data between the local electrical bus and the optical bus; and a controller coupled to the optical link interface for locally controlling the selected data routing between the local electrical bus and the optical bus; and the first module generating, transmitting and receiving optical signals of a first predetermined wavelength, and the second module generating, transmitting and receiving optical signals of a second predetermined wavelength, the interface module isolating the optical signals of the first and second modules, the interface module generating, transmitting and receiving optical signals of both the first and second predetermined wavelengths to and from the first and second sets of modules.

10. A data transmission network, comprising:

a global electrical bus;

a local electrical bus;

an input optical bus;

an output optical bus;

a plurality of network backplane modules, each module comprising:

a bus bridge coupled to the local electrical bus and the global electrical bus for routing data therebetween;

a plurality of bidirectional optical-electrical converters coupled to the input optical bus for converting an optical signal transmitted on the input optical bus into an electrical signal and vice versa;

a plurality of bidirectional electrical-optical converters coupled to the output optical bus for converting an optical signal transmitted on the output optical bus into an electrical signal and vice versa;

an optical link interface coupled to the local electrical bus and the plurality of bidirectional optical electrical converters coupled to the input optical bus and the plurality of bidirectional electrical-optical converters coupled to the output optical bus for selecting data and routing the selected data between the local electrical bus and the input optical bus or the output optical bus or between the input optical bus and the output optical bus; and a controller coupled to the optical link interface for locally controlling the selected data routing between the local electrical bus, the input optical bus and the output optical bus.

11. The data transmission network, as set forth in claim 10, wherein each network backplane module further comprises:

a photodetector receiving a plurality of optical signals from the optical bus for a predetermined number of incoming channels;

optical-to-electrical converters coupled to the photodetector for converting the received optical signals to a plurality of electrical signals;

a switch coupled to the optical-to-electrical converters for switching the electrical signals to a predetermined number of outgoing channels;

electrical-to-optical converters coupled to the switch for converting the electrical signals to a plurality of laser diode input signals; and a laser diode coupled to the electrical-to-optical converters for generating and transmitting a plurality of optical signals in response to the laser diode input signals.

12. The data transmission network, as set forth in claim 11, wherein the laser diode comprises a vertical cavity surface emitting laser (VCSEL) diode.

* * * * *